United States Patent Office.

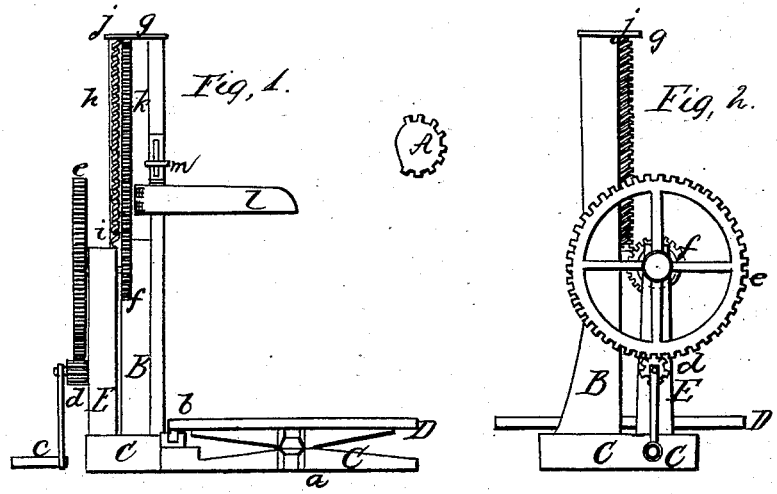

MARSHAL MORSE AND P. W. SAWYER, OF GRAY, MAINE.

Letters Patent No. 78,228, dated May 26, 1868.

IMPROVED CHEESE-CUTTER.

*The Schedule referred to in these Letters Patent and making part of the same.*

TO ALL WHOM IT MAY CONCERN:

Be it known that we, MARSHAL MORSE and P. W. SAWYER, of Gray, in the county of Cumberland, and State of Maine, have invented a new and useful Improved Cheese-Cutter; and we hereby declare the following to be a full, clear, and exact description thereof, which will enable others to make and use our invention, reference being had to the accompanying drawings, forming part of this specification, in which—

Figure 1 is a side elevation.

Figure 2, an end elevation.

A is a detail of the segment-gear.

Our invention consists in a certain arrangement of devices for operating a cheese-cutter, and also in a device for rendering the knife automatic in its withdrawal from the cheese.

B shows a standard, set on the base, C. D is a turn-table, on a pivot at $a$, and balanced, moreover, by a roller at $b$. $c$ is a hand-crank, by which to turn the small gear $d$, set in the upright, E. $e$ is a larger gear, matching $d$. On the same shaft with $e$ is another gear, $f$, working in the sliding toothed rack $g$, and having teeth only on a portion of its edges, as illustrated at A. $h$ is a coiled spring, attached to the rack at $i$, and the standard B at $j$. Rigidly attached to the sliding toothed rack is the slide $k$, bearing the knife $l$. By turning the crank $c$, the gear $e$ is caused to revolve, and thus the gear $f$, or A, is moved. Thus the rack $g$ is drawn downward, and with it the knife $l$. By this turning of the crank, $c$, the teeth of $f$, or A, are all caught into the teeth of the rack $g$, and when the knife $l$ has reached the table D, so as to have cut the cheese, the smooth part of $f$, or A, comes around to the rack, and thus forces it downward no longer. At the same time the rack is drawn upward by the coil $h$, and with it, of course, the knife also, and thus is ready for another cut. The cheese is placed on the turn-table D.

As the successive slices are cut from the cheese, the table D may be revolved so as to present to the knife the desired size of piece or slice next to be cut. $m$ is an adjustable slide-stop, to prevent the knife from rising, by the operation of the coil $h$, higher than desirable.

We are aware that cutters have been made operating a knife by an arrangement of gears, and having a table for the cheese to rest upon. These we do not claim; but What we do claim as our invention, and desire to secure by Letters Patent, is—

1. The combination of the coil $h$, rack $g$, slide $k$, and knife $l$, as and for the purpose described.
2. The slide-stop $m$, in combination with the self-retracting knife $l$, as and for the purposes described.

MARSHAL MORSE,
P. W. SAWYER.

Witnesses:
W. H. CLIFFORD,
WM. FRANK SEAVEY.